March 13, 1962
D. A. DAHLSTROM
3,024,909
VORTICAL TYPE GRIT SEPARATOR
Filed April 27, 1959
3 Sheets-Sheet 1
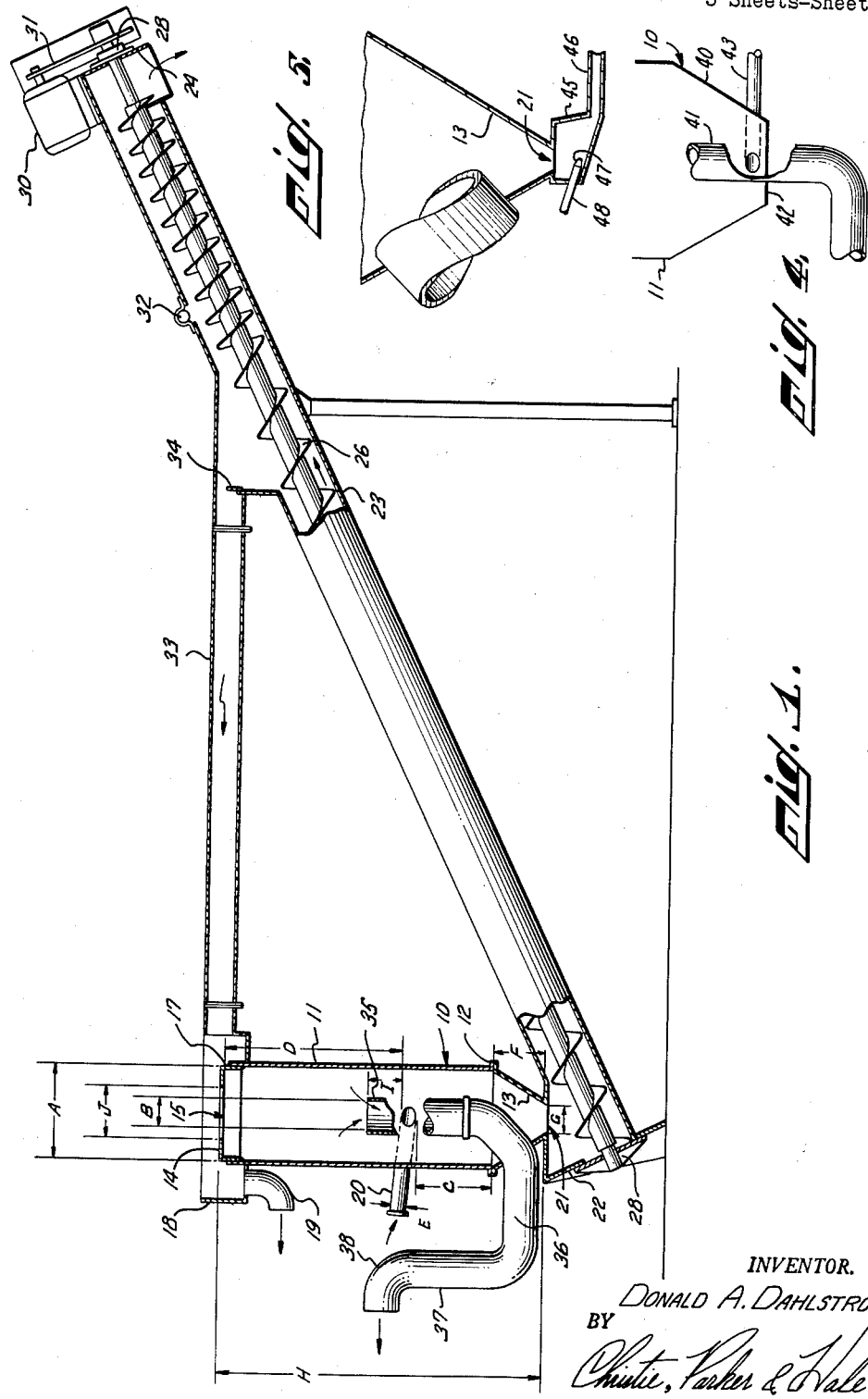
INVENTOR.
DONALD A. DAHLSTROM
BY
Christie, Parker & Hale
ATTORNEYS.

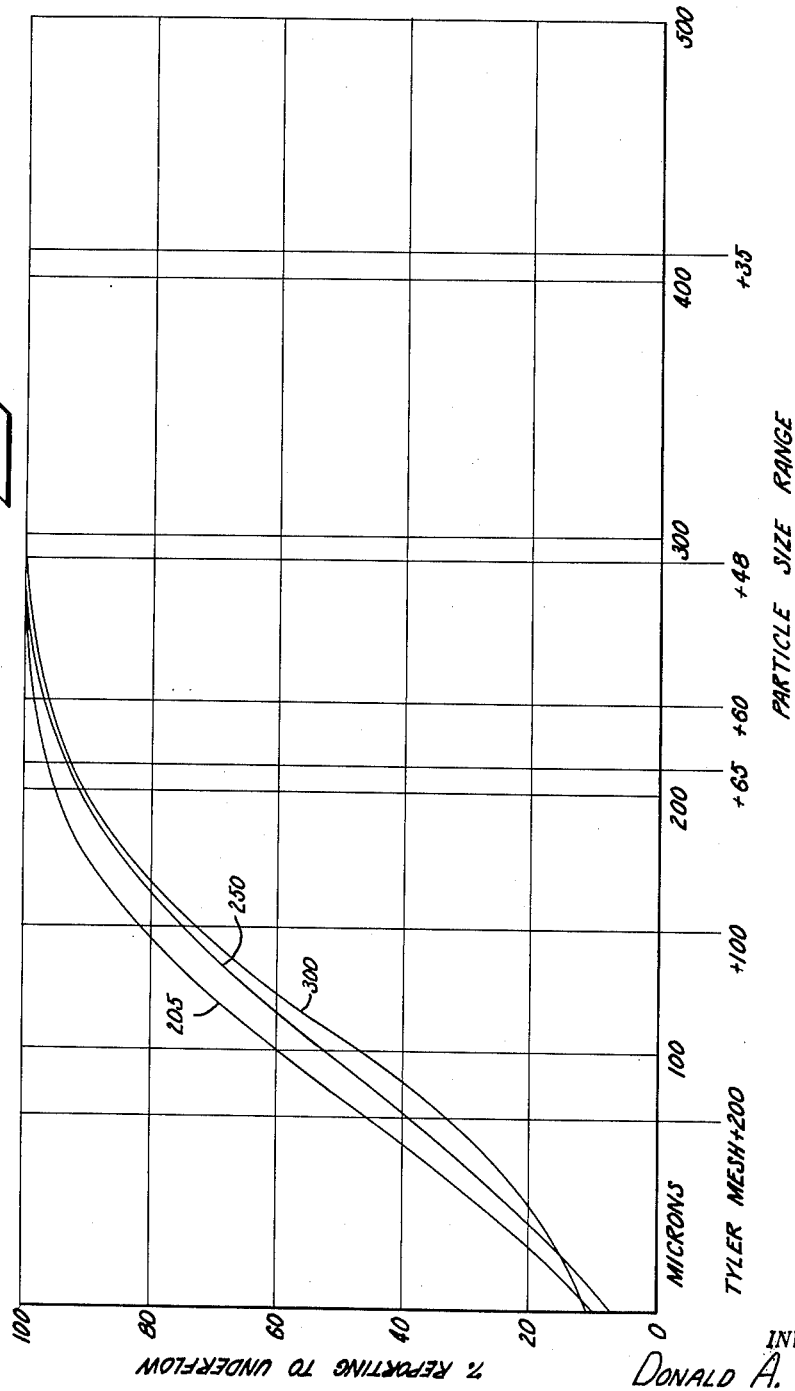

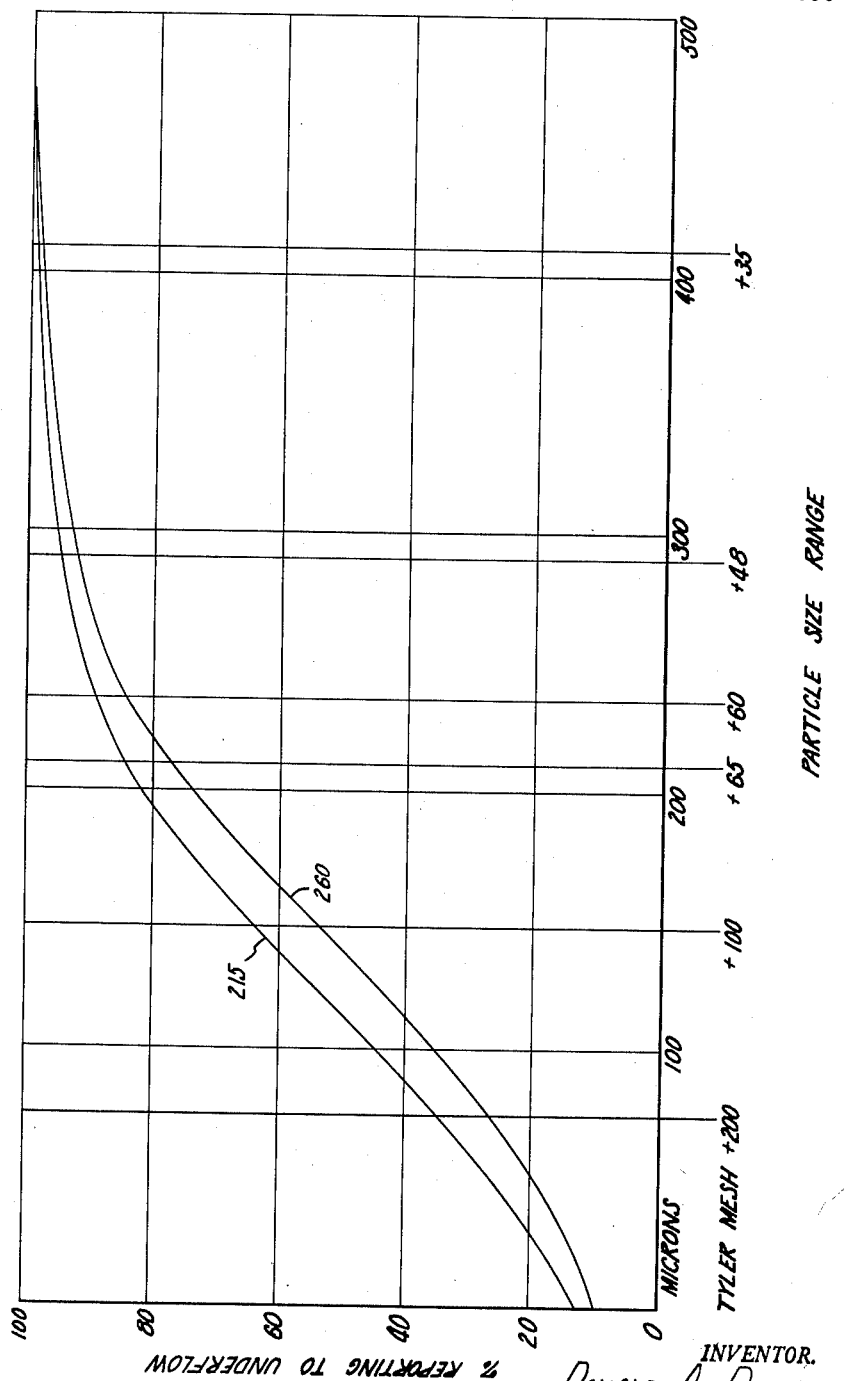

United States Patent Office 3,024,909
Patented Mar. 13, 1962

3,024,909
VORTICAL TYPE GRIT SEPARATOR
Donald A. Dahlstrom, Deerfield, Ill., assignor to Process Engineers, Inc., San Mateo, Calif., a corporation of Nevada
Filed Apr. 27, 1959, Ser. No. 809,269
1 Claim. (Cl. 209—211)

This invention is concerned with the removal of grit or solids from liquid suspensions and provides improved methods and apparatus with this end in view.

In United States Patent 2,760,635, granted August 28, 1956, I have described and claimed process and apparatus for separating mixtures of solids in a liquid medium employing centrifugal forces combined with gravity. In accordance with this patent I employ a vessel adapted to contain a body of liquid freely whirling about an upright axis under conditions such that at least a portion of the top surface of the body is free to rise and fall against the atmosphere. The height of the body accordingly varies markedly as the rate of introduction of a feed stream varies. The whirling of the body is brought about by introducing a feed stream comprising a suspension of solids in liquid tangentially into the periphery of the body. The centrifugal forces thus developed, aided by gravity, cause coarser or heavier solid particles in the suspension to migrate to the bottom of the body, from whence they are removed continuously in a coaxial underflow stream. Finer or lighter particles are removed from the whirling body in an overflow stream through an upwardly extending coaxial discharge tube, the entrance of which is located at or below the level at which the feed stream is introduced. My prior invention affords a number of advantages, among which are an enormous capacity in terms of volume of suspension treated per unit of space in the treatment apparatus, the maintenance of a point of separation that remains substantially constant irrespective of variations of rate of feed, a low consumption of energy, a sharper and more efficient separation of kinds of particles in the respective underflow and overflow liquids from the apparatus, and no moving parts. Many of these advantages derive from the fact that I obtain a remarkably stable free vortex pattern in the whirling liquid body and because the overflow is withdrawn from a relatively low level in the body and on its axis of revolution. However, the discharge tube of my patented apparatus is adapted to lie below the lowermost operative level of liquid in the separation vessel. This arrangement places a horizontal section of the discharge tube in a position which interferes with smooth whirling of the liquid in the upper portion of the vessel where such motion is of maximum importance to efficient removal of grit. Even when the horizontal section of the discharge tube was streamlined in the shape of an airfoil, it still caused enough turbulence to hinder classification efficiency. In addition, the method and apparatus of my prior invention will not accommodate the high variation in the rate of flow of the feed suspension which must be accepted in certain cases.

As a result of my investigations I have developed a novel open-top cyclone type degritter which operates with a much lower proportion of underflow (so that this underflow may contain a much higher proportion of solids), and over a wide flow range without adjustment or attention. Furthermore, the degritter of the present invention operates with virtually no interference of the smooth flow pattern of the liquid above the overflow discharge.

In most grit separator applications, there is a requirement that 95% of the +60 mesh grit at 2.65 to 2.75 specific gravity be removed. This may be done easily in the practice of my present invention, even though the flow rate may vary widely. Moreover, such a removal may be accomplished with a very small underflow, say 1% of even less of the inflow. Accordingly, the underflow may contain several times as much solids as the underflow obtainable in the practice of my prior invention.

In terms of apparatus, my invention contemplates a separating chamber comprising a hollow substantially upright column of circular cross section or cross sections and subtended at its bottom by an inverted hollow cone, the chamber being adapted to contain a free whirling body of liquid and grit. A tangential inlet conduit is connected to the periphery of the column for introducing a continuous tangential peripheral stream of a suspension of the grit in the liquid. An outlet is at the apex or bottom of the cone for discharging separated grit with a small proportion of the liquid. A downwardly extending overflow discharge tube disposed coaxially within the column has an opening in the vicinity of the inlet conduit for the removal of an overflow stream, which may contain finer or lighter particles not settled with the grit.

In the preferred embodiment, the overflow opening in the discharge tube is above the inlet conduit, and the discharge tube extends coaxially down the chamber almost to the apex of the conical portion, where it turns outwardly and extends through the chamber wall. At the lower position, the body of liquid has the least fluid motion, and the small degree of interference offered by the relatively short section of outwardly extending discharge tube has a minimum detrimental effect on the efficiency of grit removal.

In order that the height of the free whirling liquid body in the separating chamber be maintained substantially constant, irrespective of inflow rate, the preferred forms of my apparatus include a peripheral discharge at the top of the vertical column to take care of peak flow rates and prevent buildup of excessive head within the chamber.

The tangential inlet conduit may be horizontal, but I prefer to slope the inlet conduit slightly downward in the direction of flow, say at an angle of about 5°.

It is desirable to provide my apparatus with a peripheral discharge launder extending entirely around the top of the vertical column. In such case the top of the column should be level, so as to provide a circular discharge weir. For some applications the weir may be made adjustable as to height.

When my apparatus is provided with multiple discharges, one over the top of the column on its periphery, and the other a downwardly extending coaxial discharge tube in the chamber, it is desirable to merge the two discharges.

When some overflow takes place at the peripheral discharge at the top of the column, the efficiency and sharpness of separation of solids can be improved in the practice of my present invention by substantially reducing the cross section of the separating chamber near its top, i.e. just below the peripheral discharge. Conveniently, this reduction of cross section is obtained by an annular flange attached at its outside edge to the separating chamber proper. If desired, it may be connected at its inside edge to an upwardly extending coaxial chamber of circular cross section or sections that terminate in the peripheral discharge. The flange acts as a barrier for upwardly migrating grit so that the discharged fluid at the top of the apparatus is cleaner.

My invention will be understood more thoroughly from the following detailed description, and the accompanying drawings in which:

FIG. 1 is an elevation, partly in section, of the presently preferred form of the cyclone degritter;

FIG. 2 is a plot of three sets of data obtained with the apparatus shown in FIG. 1 at five different throughput rates, and with the discharge tube opening located above the feed inlet;

FIG. 3 is a plot of two sets of data obtained in a manner similar to those shown in FIG. 2 except that the discharge tube opening was located below the feed inlet;

FIG. 4 is a fragmentary elevation, partly broken away, of the lower portion of an alternate embodiment; and FIG. 5 is a schematic fragmentary elevation of another arrangement for removing grit from the apparatus.

The grit separator of FIG. 1 comprises an upright separating chamber 10. The upper portion of the chamber is a cylindrical shell 11 of diameter "A" and fastened by flanges 12 to a lower inverted coaxial conical portion 13 having a height "F." The top of the cylindrical shell is level and open except for a constriction imposed by an annular flange 14 having a circular central opening 15 of diameter "J." The inner and outer edges of the flange are circular. A downwardly extending annular lip 17 formed integrally with the outer edge of the flange is welded to the interior of the upper end of the chamber to make a water-tight seal against the chamber wall. A peripheral overflow launder 18 having a discharge pipe 19 at its bottom is disposed around the flange. The outer wall of the overflow launder extends above and below the flange.

A tangential feed inlet pipe 20 of diameter "E" is attached to the lower part of the cylindrical shell at distance "C" above the lower end of the shell and enters the shell at its periphery. This feed inlet pipe slopes downwardly slightly (say 5° from the horizontal) in the direction of flow into the separating chamber.

The apex of the cone of the separating chamber is truncated to form a circular opening 21 of diameter "G" which opens into a grit sump 22 at the lower end of an upwardly extending tubular grit trough 23 having a grit discharge opening 24 at its upper end. A screw conveyor 26 is disposed in the grit trough and journaled at each end thereof by bearings 28. A driving motor 30 on the upper end of the grit trough supplies power through a belt 31 to the upper end of the conveyor to cause it to turn and carry grit up from the sump to the grit discharge opening.

A wash nozzle 32 mounted on the inside of the grit trough over the upper portion of the screw conveyor is supplied water under pressure by suitable means (not shown) to wash fines or organic matter which may have settled with the grit. A horizontal wash return conduit 33 is connected at one end to the annular launder on the separating chamber, and at the other end to the grit trough just below the wash nozzle. An internal weir 34 is disposed in the wash conduit where it joints the conveyor trough.

An overflow discharge tube 35 of a diameter "B" and coaxially disposed within the cylindrical column opens at the upper end a distance "I" above the top of the feed inlet. The discharge tube extends coaxially a substantial distance below the feed inlet, and then turns outwardly at an angle of about 45° to pass through the conical portion of the separator. The discharge tube includes a horizontal section 36 outside the separator, and a vertical section 37 which terminates in a 90° elbow 38 at approximately the level of the upper end of the discharge tube.

The apparatus of FIG. 1 has been designed for use in classification of a variety of solid-liquid mixtures containing grit, and is adapted to determine optimum separating conditions for such mixtures. Although dimensions and proportions are not entirely critical a degritter built in accordance with FIG. 1 with the following dimensions has operated satisfactorily with a variety of mixtures:

Diameter of cylindrical shell_____inches__ 30
Height of cylindrical shell_____do____ 45
Distance from bottom of cylindrical shell to center of tangential peripheral inlet pipe_____do____ 15
Diameter of inlet pipe_____do____ 4
Diameter of opening at the apex of the conical portion _____do____ 2
Cone angle_____ 60°
Diameter of peripheral launder_____inches__ 42
Height of peripheral launder_____do____ 17
Diameter of outflow from peripheral launder_do____ 4
Diameter of discharge tube_____do____ 8
Height of discharge tube opening above center line of feed inlet_____do____ 10

In the operation of the apparatus of FIG. 1 a feed suspension containing grit in water, with or without finer solid particles, is introduced into the separating chamber through the tangential peripheral inlet pipe. This causes the body of suspension contained in the separating chamber to whirl freely about the upright axis of the separating chamber both in the cylindrical and in the conical portions thereof. In this whirling mass grit tends to settle and also tends to be thrown toward the wall of the separating chamber, down which it migrates to be discharged continuously through the bottom of the underflow cone or conduit, and into the grit sump. The screw conveyor carries the grit up past the washing nozzle where fines and organic materials, if present, are washed from the grit. The wash water and material washed from the grit flows over the weir in the wash conduit, is carried through the wash conduit to the launder around the upper end of the separator, and passes out the launder discharge. Since the grit discharge opening in the trough is above the chamber inlet, there is no free underflow, as is the case in most conventional cyclone separators. Consequently, the amount of liquid removed through the chamber underflow is determined by the rate of grit removed from the sump, and the ratio of grit to liquid can be kept exceptionally high because the separator of this invention can be operated with the conical section substantially full of grit. Thus, the amount of liquid handled through the underflow is greatly reduced. Liquid, accompanied by finer suspended solids if these are present, overflows continuously at the discharge tube opening, which is relatively large in proportion to the inflow pipe, thereby tending to keep the height of the column of liquid in the separating chamber substantially constant even with great changes in flow rate of the entering feed. In other words, so much overflow area is available that little change in height is necessary to obtain a great increase in flow rate. Preferably, the diameter of the discharge tube opening is twice that of the feed inlet. Under abnormal surging conditions, excess liquid spills out the top of the chamber into the launder. The annular flange reduces the tendency for grit to be carried out in the overflow under such conditions. Although not entirely critical, the opening through the flange should preferably be at least three times the diameter of the inlet pipe.

The apparatus of FIG. 1, built in accordance with the foregoing specifications, performed under different total throughputs as shown by the data plotted in FIG. 2, in which curves 205, 250, and 300 represent data from throughput rates of 205, 250, and 300 gallons of water per minute, respectively. The water contained sand (grit) of 2.67 specific gravity.

FIG. 2 plots grit particle size range vs. the percent of the particle size range reporting to the underflow at different total throughputs. The curves of FIG. 2 show that the more than 95% of the +60 mesh grit reports to the underflow even though the total throughput varies from 205 to 300 gallons per minute.

In each of the three runs shown in FIG. 2 the underflow rate through the opening in the bottom of the cone was about 20 gallons per minute. However, experimentation with underflow rates showed that the efficiency of the separation was virtually independent of underflow rate. As previously mentioned, an important advantage of the grit separator shown in FIG. 1 is that it can tolerate the build up of large quantities of grit in its bottom without increasing grit carried out by the overflow. The separator of FIG. 1 was allowed to operate with no underflow while grit collected in the bottom. There was no appreciable increase in grit in the overflow until nearly the entire conical section (a depth of 23") had filled with grit. This feature is important because it permits very low underflow rate, or even intermittent discharge of grit, from the separator with the conical bottom heavily loaded with grit, resulting in higher grit concentration in the underflow, and reducing the amount of water through the underflow when the feed water is low in grit.

Although the separator of this invention can be operated with the discharge tube opening above or below the feed inlet, the data plotted in FIG. 3, when compared to the data plotted in FIG. 2, show the advantage of operating the separator with the discharge tube opening above the feed inlet. The data of FIG. 3 were obtained with apparatus and conditions identical with those used in getting the data shown in FIG. 2, except that the discharge tube inlet was positioned 5" below the feed inlet instead of 10" above it. Lowering the discharge tube inlet dropped the percent of +60 mesh grit reporting to the underflow to about 90% at 215 gallons per minute throughput (curve 215), and to about 87.5% at 260 gallons per minute throughput (curve 260).

Although dimensions and proportions are not entirely critical in the separator of this invention, the following table lists satisfactory basic dimensions for separators of various capacities constructed in accordance with the design shown in FIG. 1. The capital letters in the table correspond to those shown in FIG. 1.

| Design capacity GPM at 2½' head loss | Separator dimensions—Inches as per Figure 1 | | | | | | | | | |
|---|---|---|---|---|---|---|---|---|---|---|
| | A | B | C | D | E | F | G | H | I | J |
| 150 | 19 | 6.07 | 20 | 40 | 3.07 | 9.5 | 8 | 72.57 | 10 | 9.20 |
| 300 | 31 | 10.02 | 20 | 40 | 5.05 | 19.8 | 8 | 84.85 | 10 | 15.14 |
| 700 | 48 | 15.25 | 20 | 40 | 7.98 | 34.5 | 8 | 102.48 | 10 | 23.94 |
| 1,400 | 60.4 | 19.18 | 20 | 40 | 10.02 | 45.2 | 8 | 115.22 | 10 | 30.06 |

Although cylindrical pipes have been used in describing the invention because they are preferred, conduits of other cross section may be used which are the equivalent of the circular cross sections in the foregoing examples.

FIG. 4 shows an alternate arrangement of this invention which is identical with the apparatus shown in FIG. 1 except for the lower portion of the equipment where grit and overflow leave the chamber. The apparatus of FIG. 4 includes an inverted coaxial conical portion 40 fastened to the shell 11. An overflow discharge tube 41 extends coaxially out the bottom of the conical portion, which is closed by an annular plate 42 sealed at its outer edge to the conical portion and at its inner edge to the discharge tube. The upper end of the discharge tube terminates as shown in FIG. 1.

An underflow outlet pipe 43 is connected tangentially to the lower end of the conical portion. The pipe 43 extends in the direction grit is urged by the swirling liquid in the chamber where the pipe opens into the conical portion. Grit is removed through the underflow pipe by a pump (not shown) or by gravity flow.

The apparatus of FIG. 1 can also be modified so that the grit opening 21 is small enough to permit the underflow to fall freely through an air gap before dropping into the grit sump 22 at the lower end of the screw conveyor washer. In this case, the upper portion of the grit sump is open to atmosphere.

FIG. 5 shows an alternate arrangement of the apparatus of FIG. 1 for removing grit from the separator. The grit sump 22 and screw conveyor 26 are replaced by a grit reservoir 45 connected to the grit discharge opening 21 in the conical portion 13 of the separator. The grit reservoir is of greater cross sectional area than the lower part of the conical portion, and provides a grit storage space well isolated from the remainder of the separator. A grit removal conduit 46 is connected to the lower portion of the grit reservoir through which grit can flow by gravity.

In those installations where it is preferable to pump the grit from the grit reservoir, a high velocity jet nozzle 47, such as a miner's nozzle, is disposed in the reservoir to direct a high velocity liquid stream across the grit reservoir and toward the grit removal conduit. The nozzle is supplied high pressure fluid, say water, through a line 48 connected to a suitable source, not shown. The high velocity water stream puts the grit into a movable state and facilitates its movement through conduit 46 to a pump (not shown), which pumps the grit to a washer (not shown). Moreover, the water jetting into the reservoir does not disturb settled grit in the conical portion because of the attenuating effect of the relatively small grit discharge opening 21. Thus, the grit is readily removed, even if the grit discharges from the separator below ground level, and must be moved to a higher elevation.

The method and apparatus of my invention may be employed satisfactorily in any instance in which solids such as grit or sand should be removed from a liquid suspension, whether or not this liquid suspension contains finer solids. By way of example, my invention is well suited to the removal of sand from a caustic slurry of finely divided leached bauxite, grit from sewage streams, and for the classification of metallurgical slurries.

I claim:

In apparatus for removing grit from a liquid suspension thereof, the combination which comprises a separating chamber comprising a hollow substantially upright cylindrical column subtended at its bottom by an inverted hollow cone, the chamber interior being of substantially uniform and unobstructed circular cross section open at its top to be in free communication with the atmosphere and adapted to contain a free whirling body of liquid and suspended grit, a tangential inlet conduit connected to the hollow cylindrical column for discharging into the column a continuous tangential peripheral stream of the suspension to impart a whirling motion to the body of liquid in the column, a peripheral overflow for the chamber located above the inlet, an annular flange fastened at its outer edge to the wall of the chamber below the peripheral overflow and above the inlet conduit to reduce sharply the cross section area of the chamber, in underflow opening at the apex of the cone for discharging grit with a small proportion of the liquid, and an overflow discharge pipe coaxially disposed within the cylindrical column, the discharge pipe having an opening above the inlet conduit for the discharge of the bulk of the degritted liquid, and the pipe extending downwardly from the said opening below the inlet conduit and out of the cone of the chamber, the interior of the cylindrical column being substantially free of any internal obstruction which would interfere with the free whirling of the body of liquid.

References Cited in the file of this patent

UNITED STATES PATENTS

| | | |
|---|---|---|
| 798,473 | Wilson | Aug. 29, 1905 |
| 1,301,544 | Crombie | Apr. 22, 1919 |
| 1,312,098 | Cerruti | Aug. 5, 1919 |
| 1,895,504 | Wuensch | Jan. 31, 1933 |
| 2,098,608 | Berges | Nov. 9, 1937 |
| 2,550,340 | Fontein | Apr. 24, 1951 |
| 2,726,763 | Rakowsky | Dec. 13, 1955 |
| 2,726,765 | Rakowsky | Dec. 13, 1955 |
| 2,760,635 | Dahlstrom | Aug. 28, 1956 |

FOREIGN PATENTS

| | | |
|---|---|---|
| 669,194 | Great Britain | Mar. 26, 1952 |